(12) United States Patent
Kubota

(10) Patent No.: US 9,864,175 B2
(45) Date of Patent: Jan. 9, 2018

(54) LENS FOR PROJECTION, AND IMAGE DISPLAY DEVICE

(71) Applicant: Takashi Kubota, Suginami-ku (JP)

(72) Inventor: Takashi Kubota, Suginami-ku (JP)

(73) Assignee: RICOH COMPANY, LTD., Tokyo (JP)

( * ) Notice: Subject to any disclaimer, the term of this patent is extended or adjusted under 35 U.S.C. 154(b) by 351 days.

(21) Appl. No.: 14/509,125

(22) Filed: Oct. 8, 2014

(65) Prior Publication Data

US 2015/0138649 A1 May 21, 2015

(30) Foreign Application Priority Data

Nov. 15, 2013 (JP) .................... 2013-237422

(51) Int. Cl.
*G02B 13/16* (2006.01)
*G02B 13/18* (2006.01)
*G02B 13/04* (2006.01)

(52) U.S. Cl.
CPC ............ *G02B 13/16* (2013.01); *G02B 13/04* (2013.01); *G02B 13/18* (2013.01)

(58) Field of Classification Search
None
See application file for complete search history.

(56) References Cited

U.S. PATENT DOCUMENTS

2008/0030871 A1* 2/2008 Tejima ................. G02B 15/177
359/676
2010/0033848 A1* 2/2010 Hatada .................. G02B 13/04
359/753

2010/0165476 A1 7/2010 Eguchi
(Continued)

FOREIGN PATENT DOCUMENTS

CN 101770067 A 7/2010
CN 102279459 A 12/2011
(Continued)

OTHER PUBLICATIONS

Combined Office Action and Search Report dated Jun. 21, 2016 in Chinese Patent Application No. 201410645138.7 with English translation.

(Continued)

*Primary Examiner* — Ricky Mack
*Assistant Examiner* — Gary O'Neill
(74) *Attorney, Agent, or Firm* — Oblon, McClelland, Maier & Neustadt, L.L.P.

(57) ABSTRACT

A lens for projection which is used in an image display device which includes an image display element and projects and displays an image displayed on an image display surface of the image display element as a projection image on a projected surface in an enlarged manner, the lens for projection including in order from an enlargement side to a reduction side, a first lens group which is constituted of at least eight lenses and has a positive refractive power; an aperture; and a second lens group which is constituted of less than or equal to four lenses and has a positive refractive power, wherein the first lens group includes one or more aspherical lenses, and the one or at least one aspherical lens included in the first lens group has a largest thickness at a most peripheral portion of the lens.

11 Claims, 11 Drawing Sheets

(56) References Cited

U.S. PATENT DOCUMENTS

| | | |
|---|---|---|
| 2011/0128637 A1 | 6/2011 | Kubota |
| 2011/0242682 A1* | 10/2011 | Yamamoto ............ G02B 7/008 359/708 |
| 2011/0310496 A1 | 12/2011 | Kubota et al. |
| 2011/0317285 A1 | 12/2011 | Ohashi et al. |
| 2012/0147485 A1 | 6/2012 | Kubota |
| 2013/0070333 A1 | 3/2013 | Takahashi et al. |
| 2013/0194488 A1 | 8/2013 | Kubota et al. |
| 2013/0194681 A1 | 8/2013 | Ohashi et al. |
| 2013/0308105 A1 | 11/2013 | Kubota |
| 2013/0314675 A1 | 11/2013 | Amano |
| 2014/0016214 A1 | 1/2014 | Kubota et al. |
| 2014/0063612 A1 | 3/2014 | Kubota |
| 2014/0126072 A1 | 5/2014 | Ohashi et al. |
| 2014/0139931 A1 | 5/2014 | Kubota |
| 2014/0185143 A1 | 7/2014 | Kubota |
| 2014/0185144 A1 | 7/2014 | Kubota |

FOREIGN PATENT DOCUMENTS

| | | | |
|---|---|---|---|
| JP | 2-201310 A | | 8/1990 |
| JP | 2001-228391 A | | 8/2001 |
| JP | 2002-303790 A | | 10/2002 |
| JP | 2007-147970 | | 6/2007 |
| JP | 2008-145639 A | | 6/2008 |
| JP | 2008-151949 A | | 7/2008 |
| JP | 2008-170720 A | | 7/2008 |
| JP | 2008151949 A | * | 7/2008 |
| JP | 2010-134343 A | | 6/2010 |
| JP | 2010-266577 A | | 11/2010 |
| JP | 2010-271664 A | | 12/2010 |
| JP | 2012-123155 A | | 6/2012 |
| JP | 2013-061604 | | 4/2013 |
| WO | WO 2012/114755 A1 | | 8/2012 |

OTHER PUBLICATIONS

Office Action dated Aug. 22, 2017 in Japanese Patent Application No. 2013-237422.

* cited by examiner focusing

DMD CG

EXAMPLE WHERE LENSES OF
FIXED GROUP OF G1 ARE
CUT AND REMOVED focusing

PROJECTION DISTANCE 705 mm

PROJECTION DISTANCE 523 mm

PROJECTION DISTANCE 1062 mm focusing

EXAMPLE WHERE LENSES OF FIXED GROUP OF G1 ARE CUT AND REMOVED focusing

PROJECTION DISTANCE 690 mm

PROJECTION DISTANCE 505 mm

PROJECTION DISTANCE 1068 mm

EXAMPLE WHERE LENSES OF FIXED GROUP OF G1 ARE CUT AND REMOVED

EXAMPLE WHERE LENS OF FIXED GROUP OF G1 IS CUT AND REMOVED

PROJECTION DISTANCE 690 mm

PROJECTION DISTANCE 506 mm

PROJECTION DISTANCE 1071 mm

PROJECTION DISTANCE 690 mm

PROJECTION DISTANCE 414 mm

PROJECTION DISTANCE 1380 mm

LENS FOR PROJECTION, AND IMAGE DISPLAY DEVICE

CROSS-REFERENCE TO RELATED APPLICATIONS

The present application is based on and claims priority from Japanese Patent Application Number 2013-237422, filed Nov. 15, 2013, the disclosure of which is hereby incorporated by reference herein in its entirety.

BACKGROUND

The present invention relates to a lens for projection, and an image display device. The image display device can be executed as a projector device.

In recent years, projector devices have been widely used for business presentations, educational use at school, and family use.

An image display element which displays an image to be projected in an enlarged manner on an image display surface is called a light valve; however, various types of image display elements such as a liquid crystal panel and the like are known.

In recent years, a micromirror device as typified by a digital micromirror device (DMD) manufactured by Texas Instruments Incorporated. has attracted attention as a light valve.

Needless to say, a lens for projection is preferably applicable to various light valves.

In addition, there is a demand for the lens for projection to be wide-angle.

As a projector device having a wide angle of view, a projection optical system having a combination of a lens system and a reflecting mirror is known.

In a projection optical system including a reflecting mirror, the projection mirror tends to become larger, and therefore, ingenuity is needed for miniaturization of a projector device.

In a case where a projection optical system is constituted of a lens system, ingenuity is needed for a wide angle of view.

As a lens for projection having a wide angle of view and a fixed focus, various types of lenses have been conventionally proposed.

Above all, Japanese Patent Number 4847110 discloses a high-performance lens for projection constituted of two lens groups in which distortion is suppressed to −1.5%, and a half angle of view of 56 degrees is achieved.

Recently, shortening a distance between a projector device and a screen more and displaying a larger-sized projection image have been demanded.

In order to achieve the above, achievement of a lens for projection having a wider angle of view is desired.

SUMMARY

An object of the present invention is to achieve a lens for projection with a wider angle of view and more favorable performance.

In order to achieve the above object, an embodiment of the present invention provides a lens for projection which is used in an image display device which includes an image display element and projects and displays an image displayed on an image display surface of the image display element as a projection image on a projected surface in an enlarged manner, the lens for projection comprising, in order from an enlargement side to a reduction side, a first lens group which is constituted of at least eight lenses and has a positive refractive power; an aperture; and a second lens group which is constituted of less than or equal to four lenses and has a positive refractive power, wherein the first lens group includes one or more aspherical lenses, and the one or at least one aspherical lens included in the first lens group has a largest thickness at a most peripheral portion of the lens.

DETAILED DESCRIPTION OF THE PREFERRED EMBODIMENTS

Figure 1A:
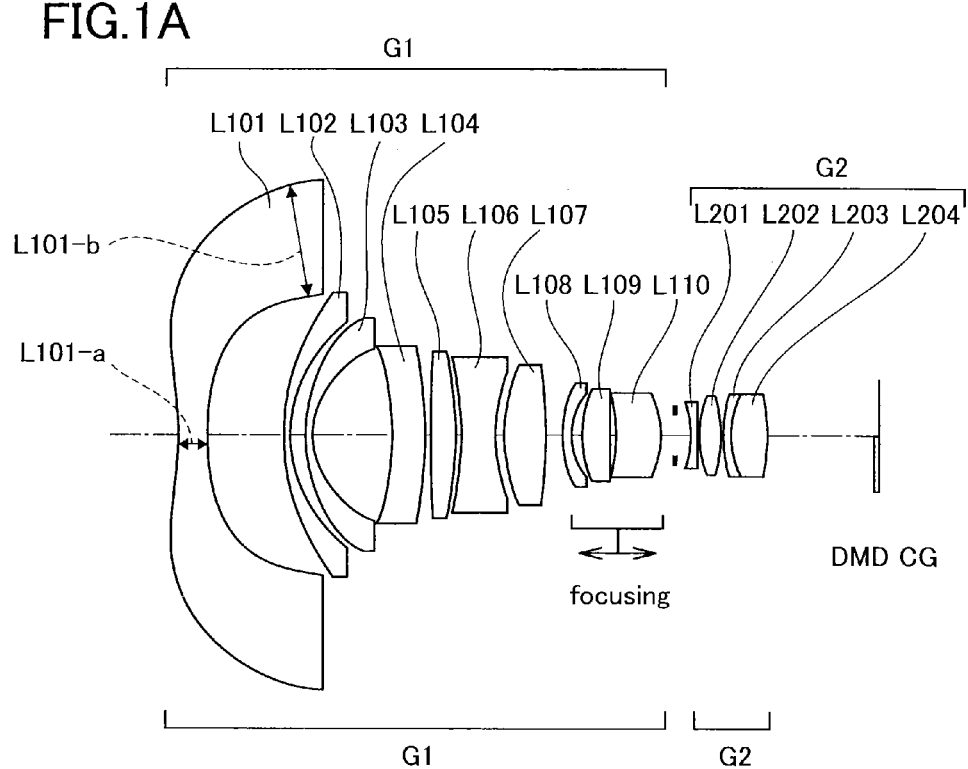
FIG. 1A is a cross-sectional view which shows a structure of a lens for projection of Example 1.

Hereinafter, embodiments of the present invention will be explained with reference to the drawings.

FIGS. 1A and 1B, FIGS. 3A and 3B, FIGS. 5A and 5B, FIGS. 7A and 7B, and FIGS. 9A and 9B show five examples of lenses for projection according to an embodiment of the present invention.

The lenses for projection shown in the above drawings correspond to later-described specific Examples 1 to 5 in order. In each of the above drawings, a left side is an enlargement side, and a right side is a reduction side.

In order to avoid complications, common reference signs are used in the above drawings.

In each of the above drawings, a reference sign G1 and a reference sign G2 denote a first lens group and a second lens group, respectively. An aperture is arranged between the first lens group G1 and the second lens group G2.

That is, the lens for projection of each example according to the embodiment of the present invention shown in each of the above drawings has a two lens-group structure in which the first lens group G1, the aperture, and the second lens group G2 are arranged in order from the enlargement side to the reduction side.

A reference sign CG in each of FIGS. 1A, 3A, 5A, 7A, and 9A denotes a cover glass of an image display element (light valve).

Generally, for a display in an enlarged manner by a lens for projection, as an imaging ray, an oblique ray is mostly used, and also in the lens for projection of each example according to the embodiment of the present invention, imaging by an oblique ray is performed.

In a case of imaging by an oblique ray, in a lens on an image side (enlargement side), a portion where an imaging ray does not pass through occurs.

Each of FIGS. 1A, 3A, 5A, 7A, and 9A is a cross-sectional view showing a lens structure, and each of FIGS. 1B, 3B, 5B, 7B, and 9B is a cross-sectional view showing a state where an oblique ray passes through a lens for projection.

As shown in each of FIGS. 1B, 3B, 5B, 7B, and 9B, a part of lenses of the first lens group G1 has a shape in which a lens portion where the imaging ray does not pass through is cut and removed.

By use of a lens in such a shape, it is possible to miniaturize a lens for projection, reduce the weight of the lens for projection, and eventually reduce the weight of a projector device itself.

Note that as shown in each of FIGS. 1B, 3B, 5B, 7B, and 9B, lenses of the first lens group G1 which constitute a moving group which performs focusing are not cut and removed.

This is because in a case where the lenses of the moving group are cut and removed, a complication of a focusing mechanism and a difficulty of forming increase.

The shape in which the lens portion where the imaging ray does not pass through is cut and removed is only an explanation of the shape, and does not necessarily mean that an unnecessary portion is cut and removed from a lens formed symmetrically with respect to an optical axis.

Each lens of the first lens group G1 in each of FIGS. 1B, 3B, 5B, 7B, and 9B may be originally formed in the shape in which the lens portion where the imaging ray does not pass through is cut and removed by a production method such as mold forming, or the like, for example.

In Examples 1 to 5, as an image display element, a DMD (Digital Micromirror Device) as a micromirror device is envisaged; however, needless to say, the image display element is not limited thereto.

Each of the first lens groups G1 and the second lens groups G2 of each of the lenses for projection according to the embodiment of the present invention shown in each of the above drawings has a positive refractive power.

That is, a refractive power distribution of the lens for projection is positive and positive.

In order to achieve both of the wide angle of view and high performance, a so-called positive lens preceding type is preferable, that is, as the first lens group G1, a positive lens group is preferably arranged before the second lens group G2, and in the lenses for projection according to the embodiment of the present invention, as described above, the positive lens group is arranged before the second lens group G2.

Additionally, focusing is performed by moving a part of lenses constituting the first lens group G1 in a direction of the optical axis.

In each of Examples 1 to 5, the first lens group G1 is constituted of at least eight lenses, and the second lens group G2 is constituted of less than or equal to four lenses.

Additionally, the first lens group G1 includes at least one aspherial lens which includes an aspherical lens surface having an inflection point in a direction perpendicular to the optical axis, and has a largest thickness at a most peripheral portion of the lens.

By use of an aspherical lens having such a shape for the first lens group G1, it is possible to achieve a non-conventional wide angle of view, and favorably suppress an occurrence of distortion.

Each of Examples 1 to 5 has a wide angle of view in which a half angle of view is equal to or more than 60 degrees.

As lenses constituting the first lens group G1, at least eight lenses are needed in order to have a half angle of view equal to or more than 60 degrees and favorably correct various aberrations.

In each of Examples 1 to 5, at least five lenses of the at least eight lenses included in the first lens group G1 are negative lenses, and this makes it easy to achieve the wide angle of view.

A distance from a lens surface on a most enlargement side of the lens for projection to a projected surface is referred to as a projection distance.

By dividing the first lens group G1 into a fixed group and at least one moving group, even if the projection distance changes, focusing on the projected surface can be performed by moving the moving group.

A part of the first lens group G1 is the fixed group, and therefore, it is possible to obtain an effect of suppressing deterioration of performance caused by eccentricity of a lens occurring at the time of production.

Note that an actual projected surface is usually a screen.

As described above, as shown in each of FIGS. 1B, 3B, 5B, 7B, and 9B, paths of an oblique ray are maintained, lenses of the moving group of the first lens group G1 are not cut, and only the fixed group of the first lens group G1 is cut and removed.

In addition to the above structure, by satisfying at least one of the following conditional expressions (1) to (6), a lens for projection according to the embodiment of the present invention makes it possible to achieve more favorable performance.

$$0.48 < F1/F2 < 0.86 \quad (1)$$

$$2.1 < |FA1/F1| < 3.0 \quad (2)$$

$$3.9 < H1s/H1e < 9.2 \quad (3)$$

$$3.8 < L101\text{-}b/L101\text{-}a < 4.4 \quad (4)$$

$$25.9 < OAL/F < 28.6 \quad (5)$$

$$4.0 < Bf/F < 4.3 \quad (6)$$

In the conditional expressions (1) to (6), a reference sign of each parameter is as follows.

A reference sign F1 is a focal length of the first lens group G1, and a reference sign F2 is a focal length of the second lens group G2.

A reference sign FA1 is a focal length of an aspherical lens which is arranged on a most enlargement side of the first lens group G1.

A reference sign H1s is an effective diameter of a lens on the most enlargement side of the first lens group G1, and a reference sign H1e is an effective diameter of a lens on a most reduction side of the first lens group G1.

A reference sign L101-a is a thickness at a thinnest portion of the lens on the most enlargement side, and a reference sign L101-b is a thickness at a thickest portion of the lens on the most enlargement side.

A reference sign OAL is a distance from a lens surface on the most enlargement side of the first lens group G1 to an image display surface of the image display element.

A reference sign F is a focal length of an entire optical system of the lens for projection, and a reference sign Bf is a distance from a lens surface on the most reduction side to the image display surface of the image display element.

The conditional expression (1) is an effective condition for a wide angle of view and a favorable aberration correction.

In order to achieve a wide-angle lens in which a half angle of view exceeds 60 degrees at the time of projection as in each later-described example, a focal length has to be shortened inevitably.

In this case, a lens structure of a first lens group G1 having a positive refractive power and a second lens group G2 having a positive refractive power is effective for having a wide angle and lengthening a back focal distance.

When a value of F1/F2 exceeds an upper limit value of the conditional expression (1), a refractive power of the first lens group G1 becomes relatively smaller in absolute value, and field curvature tends to become larger.

When the value of F1/F2 exceeds a lower limit value of the conditional expression (1), the refractive power of the first lens group G1 becomes relatively larger in absolute value, and an astigmatic difference tends to become larger.

By satisfying the conditional expression (1), it is possible to obtain an optimum solution of an astigmatism correction, and easy to suppress an increase of field curvature.

The conditional expression (2) is a condition regarding aberration corrections of distortion and astigmatism.

By satisfying the conditional expression (2), it is easy to suppress distortion and astigmatism. If not satisfying the conditional expression (2), distortion and astigmatism tend to increase, and therefore, it is preferable to satisfy the conditional expression (2).

The conditional expression (3) is an effective condition for achieving a wide angle. By satisfying the conditional expression (3), it is easily possible to achieve a half angle of view which exceeds 60 degrees, and reduce various aberrations.

When a value of H1s/H1e exceeds a lower limit value of the conditional expression (3), power of a lens on the enlargement side becomes stronger, and performance variations when a projection distance changes tend to become larger.

When the value of H1s/H1e exceeds an upper limit value of the conditional expression (3), a diameter of the lens on the enlargement side becomes larger, which is advantageous to aberration corrections; however, a larger diameter of the lens tends to lead to an increase in cost of processing.

The conditional expression (4) is an effective condition for a field curvature correction.

A parameter of the conditional expression (4): L101-b/L101-a is a largest thickness of a lens (L101)/a smallest thickness of the lens (L101), and referred to as an uneven thickness ratio.

The conditional expression (4) is a condition which sets an uneven thickness ratio of a lens on the most enlargement side to be equal to or more than 3.8, and by satisfying the conditional expression (4), it is possible to effectively correct field curvature.

If not satisfying the conditional expression (4), field curvature is insufficiently corrected.

The conditional expression (5) is an effective condition for corrections of coma aberration and chromatic aberration of magnification.

When a value of OAL/F exceeds a lower limit value of the conditional expression (5), an entire optical length is shortened, which is advantageous to miniaturization; however, coma aberration and chromatic aberration of magnification tend to become larger.

When the value of OAL/F exceeds an upper limit value of the conditional expression (5), it is effective for the corrections of coma aberration and chromatic aberration of magnification; however, the entire optical length becomes larger, and it is difficult to achieve both high performance and miniaturization.

The conditional expression (6) is a condition which regulates a ratio of the back focal distance to a focal length of an entire optical system, and a condition which influences aberrations generally.

When a value of Bf/F exceeds an upper limit value or a lower limit value of the conditional expression (6), influences on spherical aberration and coma aberration tend to become particularly prominent.

The thickness related to the conditional expression (4) is defined as a distance between a starting point of a normal line at an arbitrary position of a lens surface on a reduction side of a lens on a most enlargement side which is erected on the lens surface and extends toward an inside of the lens and an ending point at which the normal line intersects a lens surface on an enlargement side of the lens on the most enlargement side.

Figure 11:
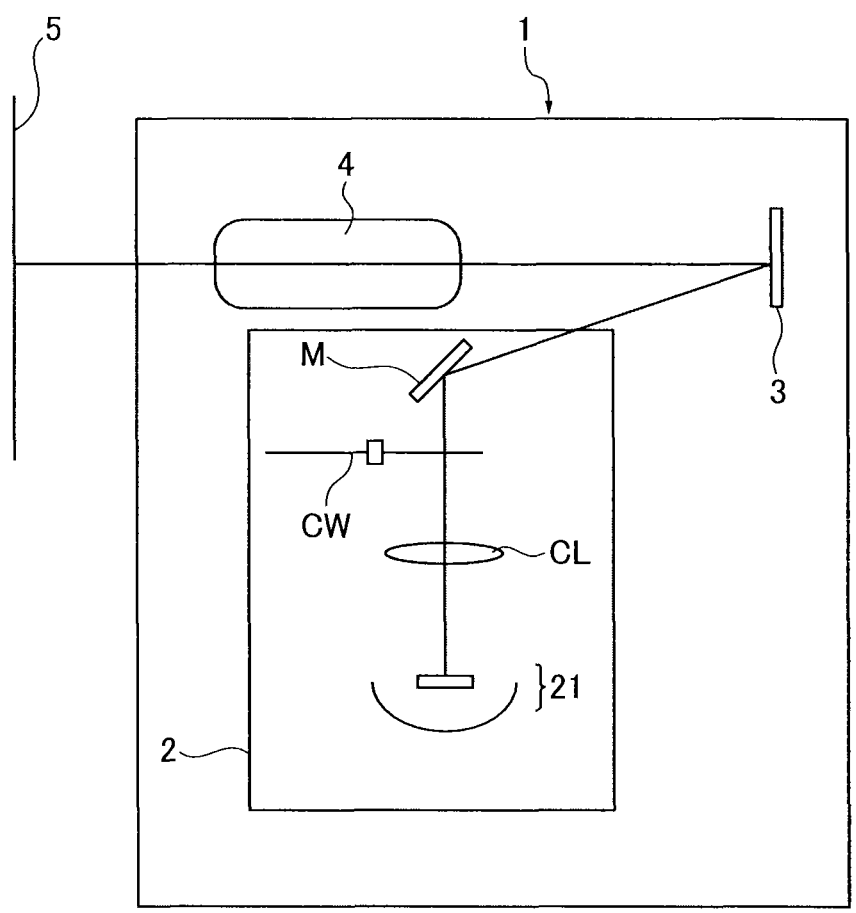
FIG. 11 is a schematic diagram which shows a structure of a projector device as an image display device.

Before describing specific examples of the lenses for projection, with reference to FIG. 11, a projector device as an image display device according to an embodiment of the present invention will be briefly explained.

A projector device 1 shown in FIG. 11 is an example to which as a light valve which is an image display element, a DMD (Digital Micromirror Device) 3 as a micromirror device is applied.

The projector device 1 includes an illumination optical system 2, the DMD 3 as the light valve, and a lens for projection 4 as a projection optical system.

As the lens for projection 4, any one of Examples 1 to 5 is used specifically.

From the illumination optical system 2, light of each of three colors of RGB (Red, Green, and Blue) is temporally separated, and emitted to the DMD 3.

In the DMD 3, display of an image is performed by selectively inclining micromirrors two-dimensionally arranged in an array manner on its image display surface.

An inclination of each of the micromirrors corresponding to each pixel is controlled at the timing when the light of each of the three temporally-separated colors is emitted.

An image to be projected is thus displayed on the image display surface of the DMD 3, and a projection luminous flux which is intensity-modulated by the image is incident to the lens for projection 4.

The incident projection luminous flux is imaged by the lens for projection 4, and then the imaged image is projected in an enlarged manner as a projection image on a screen 5 as a projected surface.

The illumination optical system 2 includes a light source 21, a condenser lens CL, a RGB color wheel CW, and a mirror M, and it is necessary to ensure a somewhat large space where those are arranged.

Therefore, an incident angle of illumination light which is emitted from the illumination optical system 2 to the DMD 3 needs to be somewhat large.

Due to such a relationship regarding the space for the lens for projection 4 and the illumination optical system 2, the lens for projection 4 needs to ensure a back focal distance to some extent.

In the lens for projection 4 of each of Examples 1 to 5, when focusing, the second lens group G2 is fixed, and therefore, even while focusing, a sufficiently large back focal distance is ensured.

EXAMPLES

Hereinafter, five specific examples of lenses for projection according to the embodiment of the present invention will be explained.

The meaning of reference signs in each example is as follows.
F: a focal length of an entire optical system
Fno: an f-number
R: curvature radius (paraxial curvature radius in an aspherical surface)
D: a distance between surfaces
Nd: a refractive index
vd: an Abbe's number
BF: a back focal distance An aspherical surface is defined by the following known expression.

$$X=(H^2/R)/[1+\{1-K(H/r)^2\}^{1/2}]+C4 \cdot H^4+C6 \cdot H^6+C8 \cdot H^8+C10 \cdot H^{10}+\ldots$$

In the above expression, X is a displacement in an optical axis direction in a position corresponding to a height H from an optical axis when an apex of a surface is taken as reference, K is a conical coefficient, and C4, C6, C8, C10, . . . are aspherical coefficients.

In each of Examples 1 to 5, a DMD is envisaged as a light valve, and the DMD has a cover glass CG.

Example 1

Figure 1B:
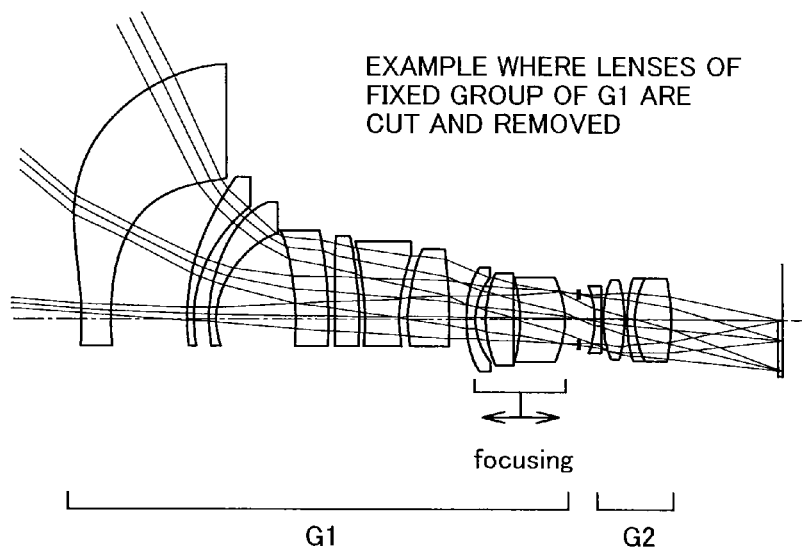
FIG. 1B is a cross-sectional view which shows a state where an oblique ray passes through the lens for projection.

Each of FIGS. 1A and 1B shows a lens for projection of Example 1.

As shown in each of FIGS. 1A and 1B, a first lens group G1 is constituted of ten lenses L101 to L110, and a second lens group G2 is constituted of four lenses L201 to L204.

The first lens group G1 is a positive lens group, and in the first lens group G1, in order from the enlargement side to the reduction side, the lenses L101 to L110 are arranged.

The lens L101, which is arranged on a most enlargement side, is considered a form of a negative meniscus lens.

A surface on the enlargement side of the lens L101 is an aspherical surface which has a concave shape on the enlargement side at a center portion of the lens L101 around an optical axis, has an inflection point in a direction perpendicular to the optical axis, and has a convex shape on the enlargement side at a peripheral portion of the lens L101. Additionally, the lens L101 has a largest thickness at a most peripheral portion of the lens L101.

Additionally, the lens L101 has a large uneven thickness ratio.

The lens L102 is a negative meniscus lens which has a concave surface on the reduction side, and the lens L103 is a negative meniscus lens which has a concave surface on the reduction side.

The lens L104 is a positive meniscus lens which has a convex surface on the reduction side, the lens L105 is a biconvex lens, the lens L106 is a biconcave lens, and the lens L107 is a biconvex lens.

The lens L108 is a negative meniscus lens which has a concave surface on the reduction side, and the lens L109 is a positive meniscus lens which has a convex surface on the enlargement side.

The lens L110 is a positive meniscus lens which has a convex surface on the reduction side.

Accordingly, the lenses L101, L102, L103, L106, and L108 of the ten lenses constituting the first lens group G1 are negative lenses, and the remaining five lenses are positive lenses.

The three lenses L108, L109, and L110 of the first lens group G1 constitute a moving group which moves in the optical axis direction when focusing. The lenses of the first lens group G1 except the lenses L108, L109, and L110 constitute a fixed group.

The second lens group G2 is a positive lens group which is constituted of four lenses L201, L202, L203, and L204.

The lens L201 is a negative meniscus lens which has a concave surface on the enlargement side, and the lens L202 is a biconvex lens.

The lens L203 is a negative meniscus lens which has a concave surface on the reduction side, the lens L204 is a biconvex lens, and those lenses L203 and L204 are cemented.

Note that in explanations regarding Examples 1 to 5, a biconvex lens is a form of a positive lens, and a biconcave lens is a form of a negative lens.

In addition, parameters L101-a and L101-b of the conditional expression (4) are as illustrated in FIG. 1A, and the same is also true in FIGS. 3A, 5A, 7A, and 9A of subsequent Examples after Example 1.

In Example 1, a range of the focal length of the entire optical system: F, the f-number: Fno, and a half angle of view at a wide-angle end: ωw are as follows.

$F=5.76$ mm, $Fno=2.55$, and $\omega w=62.9°$.

Data of Example 1 is shown in Table 1.

TABLE 1

| | R | D | Nd | vd | Lens | Group |
|---|---|---|---|---|---|---|
| 1* | −60.873 | 6.5 | 1.5247 | 56.2 | L101 | G1 |
| 2* | 59.543 | 17.6 | | | | |
| 3 | 50.005 | 1.5 | 1.9229 | 20.9 | L102 | |
| 4 | 31.127 | 3.5 | | | | |
| 5* | 39.567 | 1.6 | 1.5247 | 56.2 | L103 | |
| 6* | 19.552 | 17.7 | | | | |
| 7 | −57.001 | 7.3 | 1.7725 | 49.6 | L104 | |
| 8 | −98.785 | 1.4 | | | | |
| 9 | 846.309 | 5.5 | 1.7174 | 29.5 | L105 | |
| 10 | −93.668 | 1.3 | | | | |
| 11 | −66.399 | 7.6 | 1.7130 | 53.9 | L106 | |
| 12 | 37.689 | 2.0 | | | | |
| 13 | 36.302 | 9.5 | 1.7135 | 28.1 | L107 | |
| 14 | −102.499 | s14 | | | | |
| 15 | 25.387 | 1.9 | 1.7725 | 49.6 | L108 | |
| 16 | 14.950 | 2.5 | | | | |
| 17 | 27.799 | 5.9 | 1.6990 | 30.1 | L109 | |
| 18 | INF | 1.5 | | | | |
| 19 | −35.325 | 10.1 | 1.4970 | 81.6 | L110 | |
| 20 | −21.040 | s20 | | | | |
| 21 | INF | 3.6 | | | | G2 |
| 22 | −19.126 | 1.5 | 1.8340 | 37.3 | L201 | |
| 23 | −176.595 | 0.3 | | | | |
| 24 | 23.020 | 5.0 | 1.4970 | 81.6 | L202 | |
| 25 | −29.553 | 0.5 | | | | |
| 26 | 32.583 | 1.5 | 1.9229 | 20.9 | L203 | |

TABLE 1-continued

|  | R | D | Nd | vd | Lens | Group |
|---|---|---|---|---|---|---|
| 27 | 18.038 | 8.4 | 1.5168 | 64.2 | L204 |  |
| 28* | −24.818 | 24.0 |  |  |  |  |
| 29 | INF | 1.1 | 1.5168 | 64.2 | CG | — |
| 30 | INF | — |  |  |  |  |

In Table 1, numbers in the leftmost column are surface numbers counted from the enlargement side to the reduction side, and a surface of the aperture (surface number in Table 1: 21), and surfaces of the cover glass CG (surface numbers in Table 1: 29, 30) are included.

INF in Table 1 represents that curvature radius is infinite, and surface numbers with * (asterisk) represent aspherical surfaces.

Those items are also true in the subsequent Examples after Example 1.

"Data of Aspherical Surfaces"

Data of aspherical surfaces is shown in Table 2.

TABLE 2

|  | 1 | 2 | 5 | 6 | 28 |
|---|---|---|---|---|---|
| k | 0 | −3.13791 | 0 | 0.00176 | −2.05990 |
| C4 | 1.2782E−05 | −4.4052E−06 | 5.7935E−06 | 2.1791E−05 | 3.6035E−05 |
| C6 | −5.1880E−09 | 3.6435E−08 | 6.6393E−10 | −6.6557E−08 | 3.6414E−07 |
| C8 | 6.1110E−14 | −3.4915E−11 | −1.2218E−11 | −6.0931E−11 | −2.4268E−09 |
| C10 | 1.2163E−15 | 3.1234E−14 | −7.7292E−15 | −1.2366E−13 | 1.6945E−11 |
| C12 | −4.8641E−19 | −6.1797E−17 | 7.7207E−19 | −1.5351E−17 | −8.4467E−16 |
| C14 | 6.1636E−23 | 6.7928E−20 | 3.9049E−20 | 1.0605E−18 | 3.9036E−21 |
| C16 | 2.0803E−28 | −1.3538E−23 | −6.9047E−24 | −4.1268E−22 | −1.1916E−25 |
| C18 | −1.5008E−32 | 1.1499E−27 | 1.8264E−26 | 5.0031E−24 | 0.0000E+00 |
| C20 | 1.0972E−35 | −6.9572E−31 | 6.4072E−29 | −2.3351E−26 | 0.0000E+00 | s14 and s20 in Table 1 each represents a distance between surfaces which changes when focusing. s0 in Table 3 represents a distance between a lens surface of surface number 1 and a screen, which is a projection distance.

In Table 3, the distances s14 and s20 are shown when changing the projection distance s0.

TABLE 3

| s0 | s14 | s20 |
|---|---|---|
| 705 | 3.76 | 3.31 |
| 523 | 3.61 | 3.47 |
| 1062 | 4.29 | 2.79 |

"Value of Parameter of Each Conditional Expression"

In Table 4, values of parameters of the conditional expressions (1) to (6) are shown.

TABLE 4

| (1) | F1/F2 | 0.67 |
|---|---|---|
| (2) | FA1/F1 | 2.55 |
| (3) | H1s/H1e | 7.3 |
| (4) | L101 − b/L101 − a | 3.9 |
| (5) | 0AL/F | 26.9 |
| (6) | Bf/F | 4.1 |

Figure 2:
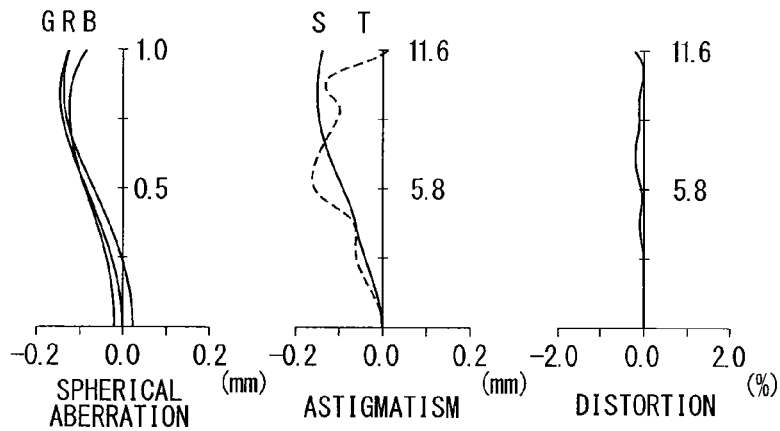
FIG. 2 shows distortion diagrams of the lens for projection of Example 1.
Figure 2:
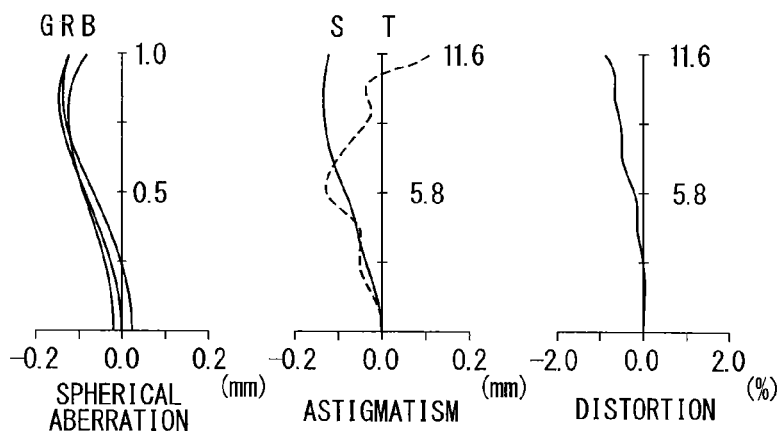
Figure 2:
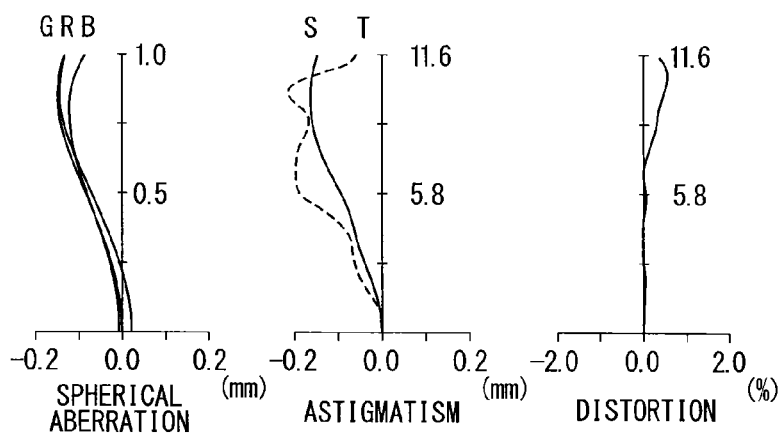

In FIG. 2, aberration diagrams of Example 1 are shown.

In FIG. 2, upper diagrams, middle diagrams, and lower diagrams show aberrations when the projection distances are 705 mm, 523 mm, and 1062 mm, respectively.

In each of the upper diagrams, middle diagrams, and lower diagrams, a diagram on the left shows spherical aberration, a diagram in the middle shows astigmatism, and a diagram on the right shows distortion.

R, G, and B in the diagrams of spherical aberration show wavelengths of R=625 nm, G=550 nm, and B=460 nm, respectively.

T and S in the diagrams of astigmatism show characteristics with respect to a tangential ray and a sagittal ray, respectively.

Note that regarding astigmatism and distortion, characteristics with respect to a wavelength of 550 nm are shown.

Those descriptions regarding the aberration diagrams are also true in aberration diagrams of the following Examples 2 to 5.

Example 2

Figure 3A:
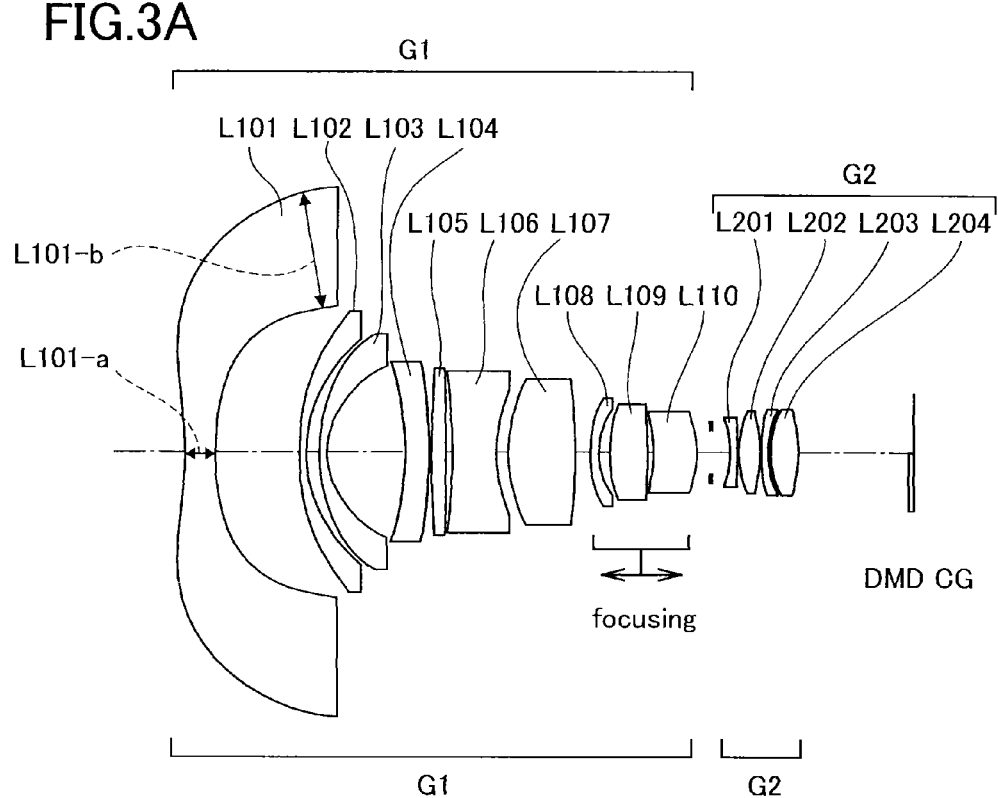
FIG. 3A is a cross-sectional view which shows a structure of a lens for projection of Example 2.
Figure 3B:
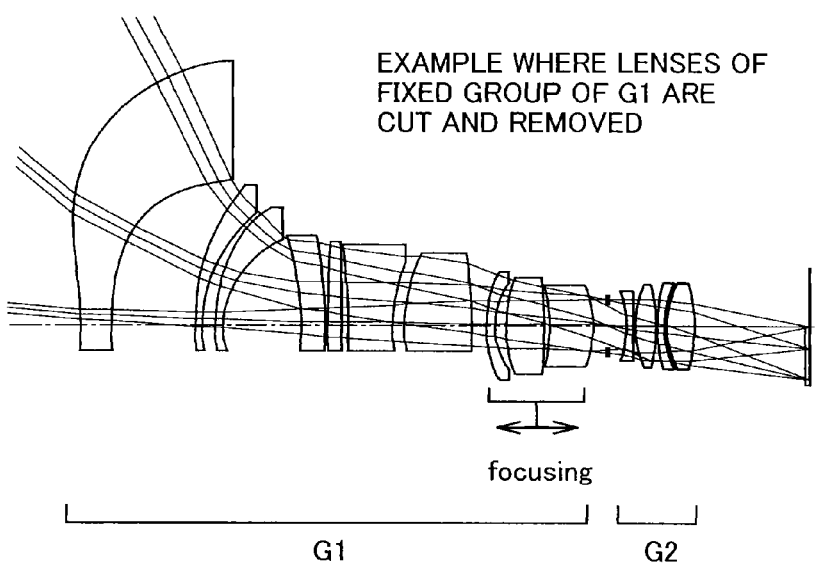
FIG. 3B is a cross-sectional view which shows a state where an oblique ray passes through the lens for projection.

Each of FIGS. 3A and 3B shows a lens for projection of Example 2.

As shown in each of FIGS. 3A and 3B, a first lens group G1 is constituted of ten lenses L101 to L110, and a second lens group G2 is constituted of four lenses L201 to L204.

Each of the first lens group G1 and the second lens group G2 has a positive power.

The lens L101 is considered a form of a negative meniscus lens.

A surface on the enlargement side of the lens L101 is an aspherical surface which has a concave shape on the enlargement side at a center portion of the lens L101 around an optical axis, has an inflection point in a direction perpendicular to the optical axis, and has a convex shape on the enlargement side at a peripheral portion of the lens L101. Additionally, the lens L101 has a largest thickness at a most peripheral portion of the lens L101.

Additionally, the lens L101 has a large uneven thickness ratio.

The lens L102 is a negative meniscus lens which has a concave surface on the reduction side, and the lens L103 is a negative meniscus lens which has a concave surface on the reduction side.

The lens L104 is a positive meniscus lens which has a convex surface on the reduction side, the lens L105 is a biconvex lens, the lens L106 is a biconcave lens, and the lens L107 is a biconvex lens.

The lens L108 is a negative meniscus lens which has a concave surface on the reduction side, and the lens L109 is a positive meniscus lens which has a convex surface on the enlargement side.

The lens L110 is a positive meniscus lens which has a convex surface on the reduction side.

Accordingly, the lenses L101, L102, L103, L106, and L108 of the ten lenses constituting the first lens group G1 are negative lenses, and the remaining five lenses are positive lenses.

The three lenses L108, L109, and L110 of the first lens group G1 constitute a moving group which moves in an optical axis direction when focusing. The lenses of the first lens group G1 except the lenses L108, L109, and L110 constitute a fixed group.

The second lens group G2 is constituted of four lenses L201, L202, L203, and L204.

The lens L201 is a negative meniscus lens which has a concave surface on the enlargement side, and the lens L202 is a biconvex lens.

The lens L203 is a negative meniscus lens which has a concave surface on the reduction side, and the lens L204 is a biconvex lens.

In Example 2, a range of the focal length of the entire optical system: F, the f-number: Fno, and a half angle of view at a wide-angle end: ωw are as follows.

$F=5.76$ mm, $Fno=2.55$, and $ωw=62.9°$.

Data of Example 2 is shown in Table 5.

TABLE 5

|  | R | D | Nd | vd | Lens | Group |
|---|---|---|---|---|---|---|
| 1* | −61.085 | 6.5 | 1.5247 | 56.2 | L101 | G1 |
| 2* | 57.124 | 18.5 |  |  |  |  |
| 3 | 47.458 | 1.7 | 2.0027 | 19.3 | L102 |  |
| 4 | 30.916 | 2.7 |  |  |  |  |
| 5* | 39.283 | 1.7 | 1.5247 | 56.2 | L103 |  |
| 6* | 19.170 | 17.3 |  |  |  |  |
| 7 | −58.170 | 5.3 | 1.7725 | 49.6 | L104 |  |
| 8 | −113.473 | 0.4 |  |  |  |  |
| 9 | 253.543 | 3.1 | 1.6990 | 30.1 | L105 |  |
| 10 | −483.145 | 1.4 |  |  |  |  |
| 11 | −129.073 | 9.6 | 1.7445 | 51.0 | L106 |  |
| 12 | 33.830 | 2.5 |  |  |  |  |
| 13 | 31.452 | 15.0 | 1.7050 | 33.0 | L107 |  |
| 14 | −127.784 | s14 |  |  |  |  |
| 15 | 25.905 | 1.8 | 1.7725 | 49.6243 | L108 |  |
| 16 | 16.198 | 2.3 |  |  |  |  |
| 17 | 30.661 | 8.2 | 1.7635 | 24.7 | L109 |  |
| 18 | −300.303 | 1.4 |  |  |  |  |
| 19 | −33.951 | 9.4 | 1.4970 | 81.6 | L110 |  |
| 20 | −24.841 | s20 |  |  |  |  |
| 21 | INF | 4.0 |  |  |  | G2 |
| 22 | −22.062 | 1.5 | 1.8340 | 37.2 | L201 |  |
| 23 | 1150.327 | 0.3 |  |  |  |  |
| 24 | 19.202 | 4.7 | 1.4970 | 81.6 | L202 |  |
| 25 | −34.923 | 0.3 |  |  |  |  |
| 26 | 37.679 | 1.5 | 1.9229 | 20.9 | L203 |  |
| 27 | 18.424 | 0.3 |  |  |  |  |
| 28* | 17.061 | 6.4 | 1.4875 | 70.4 | L204 |  |
| 29* | −20.6 | 24.0 |  |  |  |  |
| 30 | INF | 1.1 | 1.516798 | 64.1983 | CG | — |
| 31 | INF | — |  |  |  |  |

"Data of Aspherical Surfaces"

Data of aspherical surfaces is shown in Table 6.

TABLE 6

|  | 1 | 2 | 5 | 6 | 28 | 29 |
|---|---|---|---|---|---|---|
| R | −61.0847807 | 57.12358449 | 39.28252112 | 19.17001385 | 17.06053407 | −20.5813628 |
| k | 0 | −3.10576 | 0 | 0.00514 | −0.77497 | −1.26823 |
| C4 | 1.2811E−05 | −4.0193E−06 | 5.8201E−06 | 2.1932E−05 | −2.1349E−05 | 2.7354E−05 |
| C6 | −5.1982E−09 | 3.6969E−08 | 8.4284E−10 | −6.6624E−08 | 1.3518E−07 | 3.5249E−07 |
| C8 | 5.9241E−14 | −3.5718E−11 | −1.1560E−11 | −6.0678E−11 | 5.1115E−10 | −1.2703E−09 |
| C10 | 1.2162E−15 | 3.0939E−14 | −5.8624E−15 | −1.2044E−13 | −7.8960E−12 | 1.6861E−11 |
| C12 | −4.8629E−19 | −6.0915E−17 | 4.5480E−19 | 4 6313E−19 | 0.0000E+00 | −8.4323E−16 |
| C14 | 6.1699E−23 | 6.9092E−20 | 3.8289E−20 | 1.1046E−18 | 0.0000E+00 | 4.0149E−21 |
| C16 | 2.3230E−28 | −1.3168E−23 | −6.4619E−24 | −3.1040E−22 | 0.0000E+00 | −1.1720E−25 |
| C18 | −1.0977E−32 | 5.5709E−28 | 1.8923E−26 | 5.0674E−24 | 0.0000E+00 | 0.0000E+00 |
| C20 | 4.6753E−37 | −6.4150E−31 | 6.4406E−29 | −2.8737E−26 | 0.0000E+00 | 0.0000E+00 |

In Table 7, distances between surfaces: s14 and s20 are shown when changing a projection distance: s0.

TABLE 7

| s0 | s14 | s20 |
|---|---|---|
| 690 | 3.08 | 3.07 |
| 505 | 3.73 | 2.45 |
| 1068 | 2.59 | 3.52 |

"Value of Parameter of Each Conditional Expression"

In Table 8, values of parameters of the conditional expressions (1) to (6) are shown.

TABLE 8

| (1) | F1/F2 | 0.76 |
|---|---|---|
| (2) | FA1/F1 | 2.30 |
| (3) | H1s/H1e | 4.3 |
| (4) | L101 − b/L101 − a | 3.9 |
| (5) | OAL/F | 27.6 |
| (6) | Bf/F | 4.2 |

Figure 4:
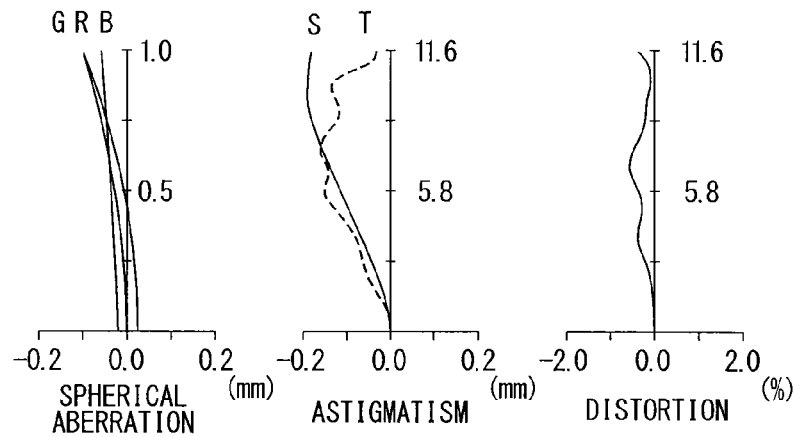
FIG. 4 shows distortion diagrams of the lens for projection of Example 2.
Figure 4:
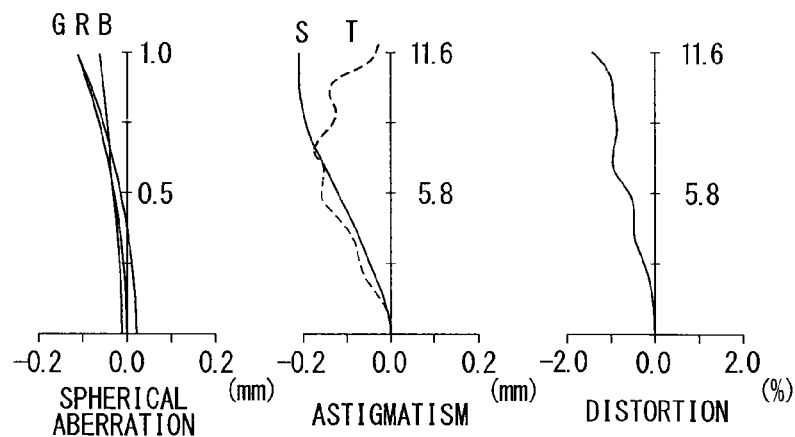
Figure 4:
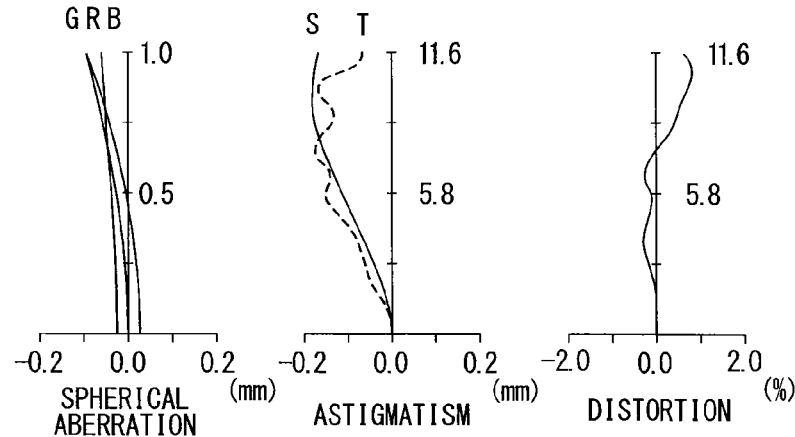

In FIG. 4, aberration diagrams of Example 2 are shown.

Example 3

Figure 5A:
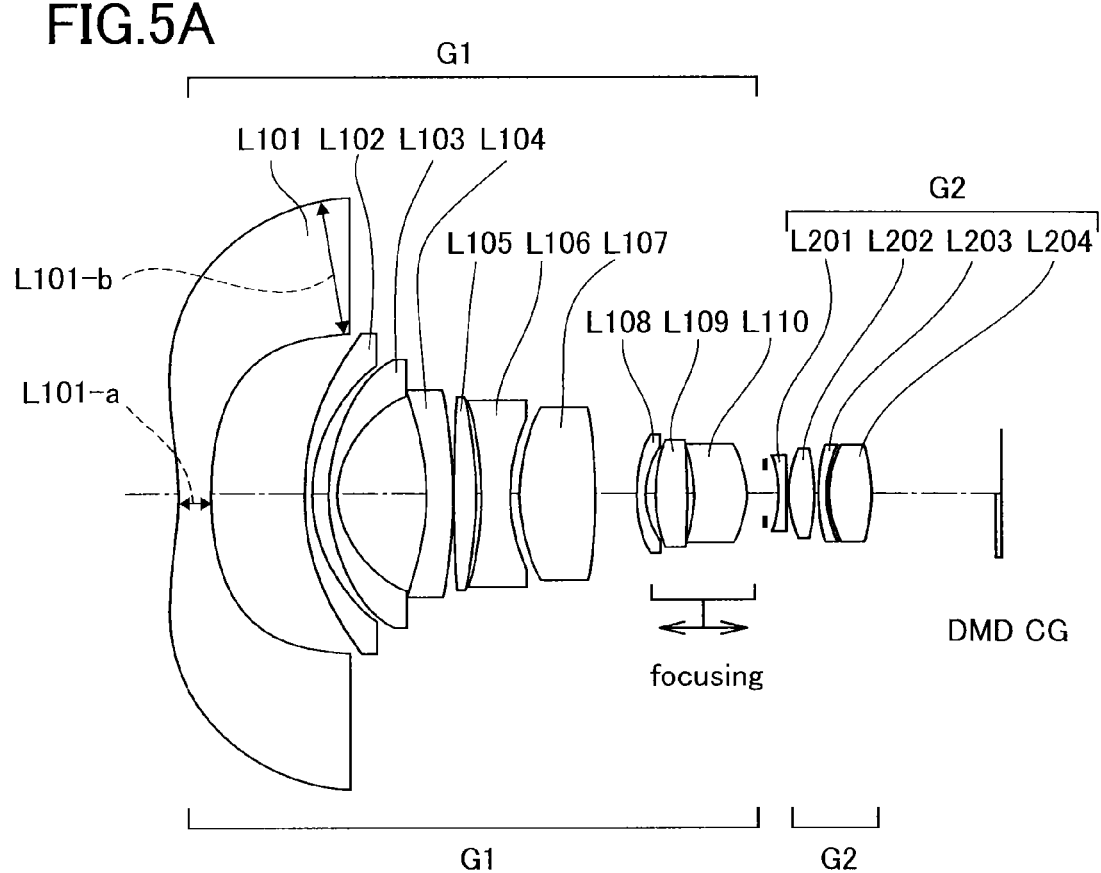
FIG. 5A is a cross-sectional view which shows a structure of a lens for projection of Example 3.
Figure 5B:
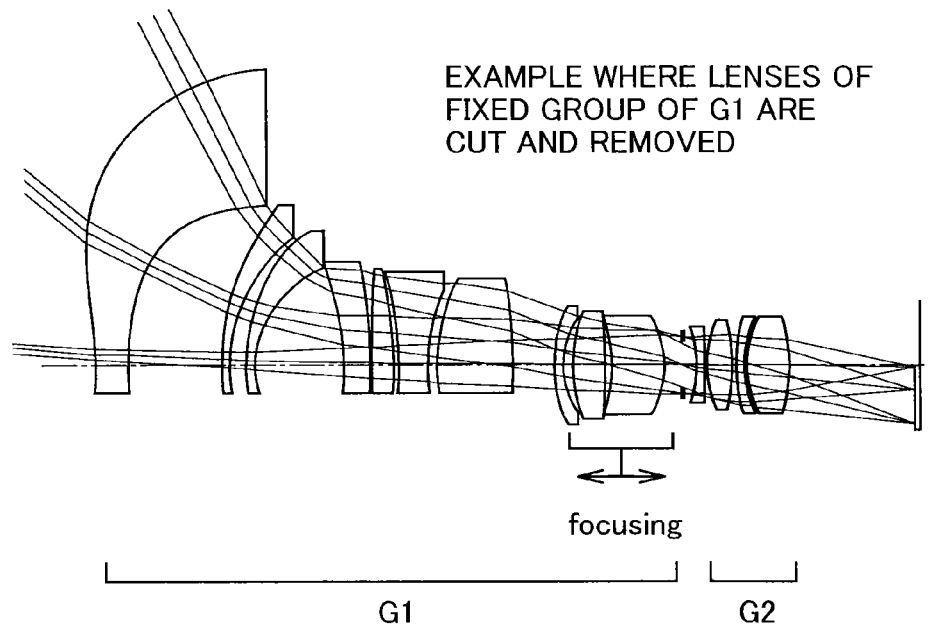
FIG. 5B is a cross-sectional view which shows a state where an oblique ray passes through the lens for projection.

Each of FIGS. 5A and 5B shows a lens for projection of Example 3.

As shown in each of FIGS. 5A and 5B, a first lens group G1 is constituted of ten lenses L101 to L110, and a second lens group G2 is constituted of four lenses L201 to L204.

Each of the first lens group G1 and the second lens group G2 has a positive power.

The lens L101 is considered a form of a negative meniscus lens.

A surface on the enlargement side of the lens L101 is an aspherical surface which has a concave shape on the enlargement side at a center portion of the lens L101 around an optical axis, has an inflection point in a direction perpendicular to the optical axis, and has a convex shape on the enlargement side at a peripheral portion of the lens L101. Additionally, the lens L101 has a largest thickness at a most peripheral portion of the lens L101.

Additionally, the lens L101 has a large uneven thickness ratio.

The lens L102 is a negative meniscus lens which has a concave surface on the reduction side, and the lens L103 is a negative meniscus lens which has a concave surface on the reduction side.

The lens L104 is a positive meniscus lens which has a convex surface on the reduction side, the lens L105 is a biconvex lens, the lens L106 is a biconcave lens, and the lens L107 is a biconvex lens.

The lens L108 is a negative meniscus lens which has a concave surface on the reduction side, and the lens L109 is a positive meniscus lens which has a convex surface on the enlargement side.

The lens L110 is a positive meniscus lens which has a convex surface on the reduction side.

Accordingly, the lenses L101, L102, L103, L106, and L108 of the ten lenses constituting the first lens group G1 are negative lenses, and the remaining five lenses are positive lenses.

The three lenses L108, L109, and L110 of the first lens group G1 constitute a moving group which moves in an optical axis direction when focusing. The lenses of the first lens group G1 except the lenses L108, L109, and L110 constitute a fixed group.

The second lens group G2 is constituted of four lenses L201, L202, L203, and L204.

The lens L201 is a negative meniscus lens which has a concave surface on the enlargement side, and the lens L202 is a biconvex lens.

The lens L203 is a negative meniscus lens which has a concave surface on the reduction side, and the lens L204 is a biconvex lens.

In Example 3, a range of the focal length of the entire optical system: F, the f-number: Fno, and a half angle of view at a wide-angle end: ωw are as follows.

$F$=5.79 mm, $Fno$=2.55, and $ωw$=62.7°.

Data of Example 3 is shown in Table 9.

TABLE 9

| | R | D | Nd | vd | Lens | Group |
|---|---|---|---|---|---|---|
| 1* | −60.794 | 6.5 | 1.5247 | 56.2 | L101 | G1 |
| 2* | 57.885 | 17.8 | | | | |
| 3 | 47.740 | 1.5 | 2.0027 | 19.3 | L102 | |
| 4 | 31.084 | 3.2 | | | | |
| 5* | 39.495 | 1.6 | 1.5247 | 56.2 | L103 | |
| 6* | 19.532 | 17.4 | | | | |
| 7 | −59.155 | 5.2 | 1.8042 | 46.5 | L104 | |
| 8 | −118.792 | 0.3 | | | | |
| 9 | 319.148 | 4.2 | 1.7174 | 29.5 | L105 | |
| 10 | −89.771 | 1.1 | | | | |
| 11 | −64.737 | 5.6 | 1.7128 | 52.7 | L106 | |
| 12 | 37.092 | 1.8 | | | | |
| 13 | 35.324 | 15.0 | 1.6961 | 31.4 | L107 | |
| 14 | −104.779 | s14 | | | | |
| 15 | 25.978 | 1.5 | 1.7725 | 49.6 | L108 | |
| 16 | 14.988 | 2.3 | | | | |
| 17 | 29.227 | 6.0 | 1.7706 | 24.8 | L109 | |

TABLE 9-continued

| | R | D | Nd | vd | Lens | Group |
|---|---|---|---|---|---|---|
| 18 | 3486.594 | 1.5 | | | | |
| 19 | −37.353 | 10.2 | 1.4970 | 81.6 | L110 | |
| 20 | −20.357 | s20 | | | | |
| 21 | INF | 2.9 | | | | G2 |
| 22 | −18.854 | 1.5 | 1.8340 | 37.3 | L201 | |
| 23 | −227.742 | 0.3 | | | | |
| 24 | 22.339 | 5.0 | 1.4970 | 81.6 | L202 | |
| 25 | −29.173 | 0.6 | | | | |
| 26 | 34.431 | 1.5 | 1.9229 | 20.9 | L203 | |
| 27 | 18.496 | 0.3 | | | | |
| 28 | 18.020 | 8.7 | 1.5168 | 64.2 | L204 | |
| 29* | −25.0 | 24.0 | | | | |
| 30 | INF | 1.1 | 1.516798 | 64.1983 | CG | — |
| 31 | INF | — | | | | |

"Data of Aspherical Surfaces"

Data of aspherical surfaces is shown in Table 10.

TABLE 10

| | 1 | 2 | 5 | 6 | 29 |
|---|---|---|---|---|---|
| R | −60.7943235 | 57.88501454 | 39.49475237 | 19.53191978 | −24.9950535 |
| k | 0 | −3.42446 | 0 | 0.00194 | −2.23382 |
| C4 | 1.2775E−05 | −4.3475E−06 | 5.7978E−06 | 2.1782E−05 | 3.7197E−05 |
| C6 | −5.1918E−09 | 3.6800E−08 | 7.8597E−10 | −6.6729E−08 | 3.7704E−07 |
| C8 | 6.0442E−14 | −3.4962E−11 | −1.2161E−11 | −6.1390E−11 | −2.1106E−09 |
| C10 | 1.2162E−15 | 3.1062E−14 | −7.8574E−15 | −1.2416E−13 | 1.5193E−11 |
| C12 | −4.8639E−19 | −6.1804E−17 | 6.6198E−19 | −1.4161E−17 | −8.4355E−16 |
| C14 | 6.1646E−23 | 6.8033E−20 | 3.8943E−20 | 1.0667E−18 | 4.0753E−21 |
| C16 | 2.1296E−28 | −1.3374E−23 | −7.0435E−24 | −3.5380E−22 | −1.1916E−25 |
| C18 | −1.4476E−32 | 1.4743E−27 | 1.8022E−26 | 5.2031E−24 | 0.0000E+00 |
| C20 | 6.2875E−36 | 3.0334E−32 | 6.3585E−29 | −2.4273E−26 | 0.0000E+00 |

In Table 11, distances between surfaces: s14 and s20 are shown when changing a projection distance: s0.

TABLE 11

| s0 | s14 | s20 |
|---|---|---|
| 695 | 7.84 | 3.41 |
| 517 | 7.54 | 3.71 |
| 1045 | 8.43 | 2.81 |

"Value of Parameter of Each Conditional Expression"

In Table 12, values of parameters of the conditional expressions (1) to (6) are shown.

TABLE 12

| (1) | F1/F2 | 0.58 |
|---|---|---|
| (2) | FA1/F1 | 2.84 |
| (3) | H1s/H1e | 3.9 |
| (4) | L101 − b/L101 − a | 4.3 |
| (5) | OAL/F | 27.6 |
| (6) | Bf/F | 4.2 |

Figure 6:
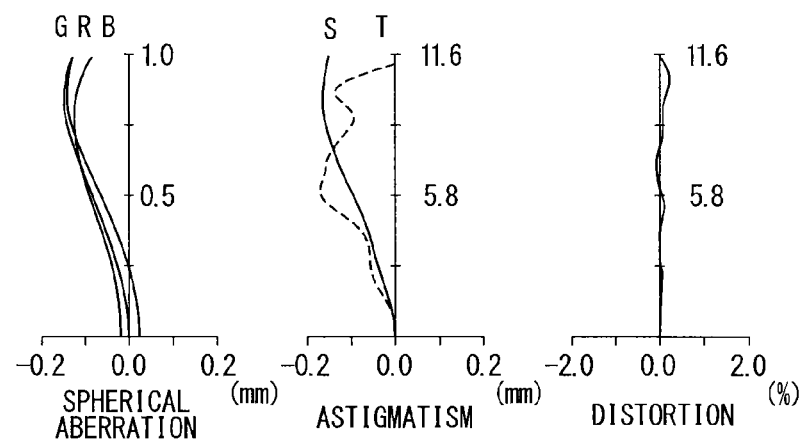
FIG. 6 shows distortion diagrams of the lens for projection of Example 3.
Figure 6:
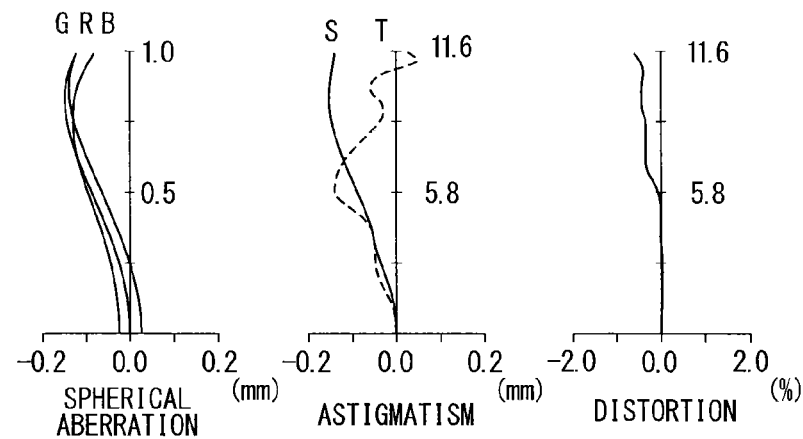
Figure 6:
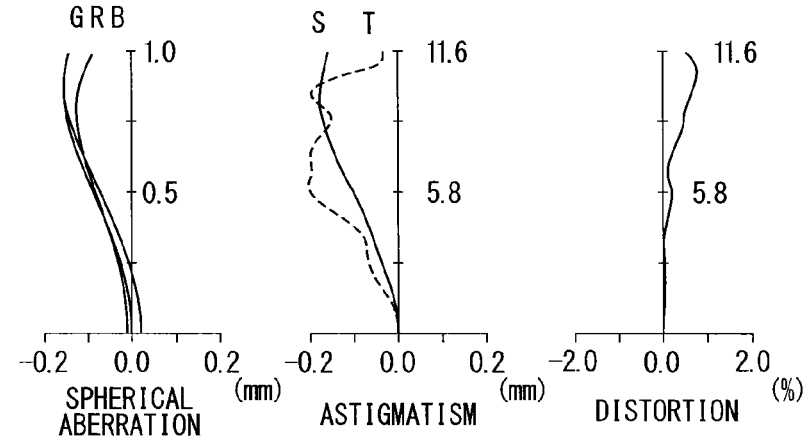

In FIG. 6, aberration diagrams of Example 3 are shown.

Example 4

Figure 7A:
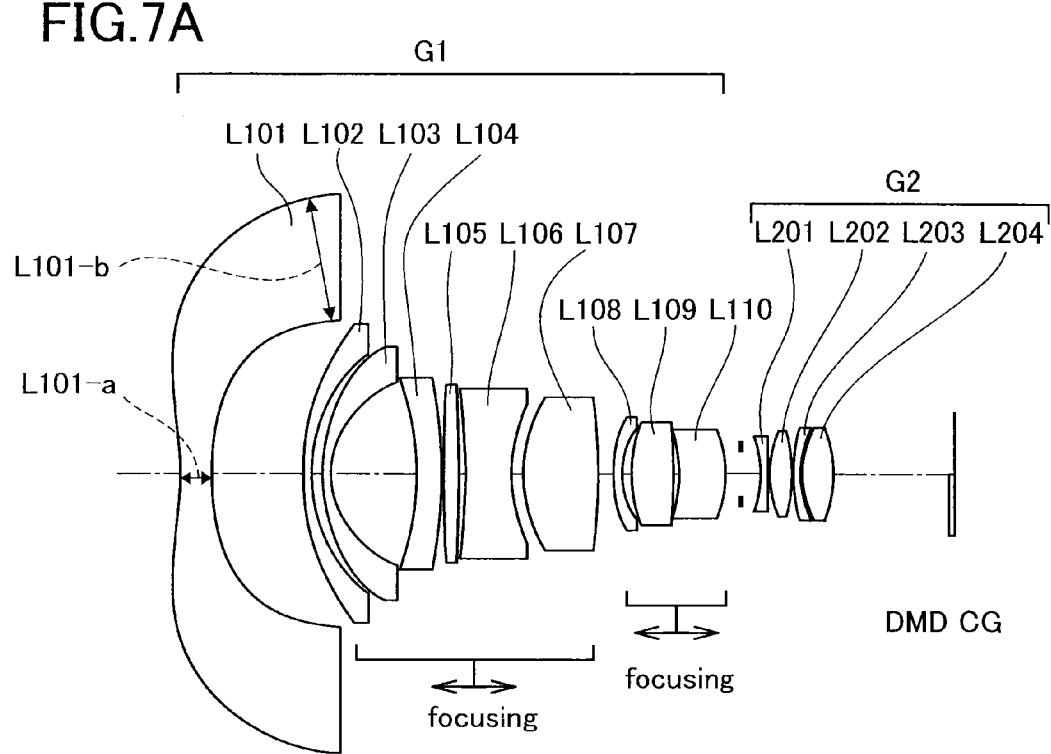
FIG. 7A is a cross-sectional view which shows a structure of a lens for projection of Example 4.
Figure 7B:
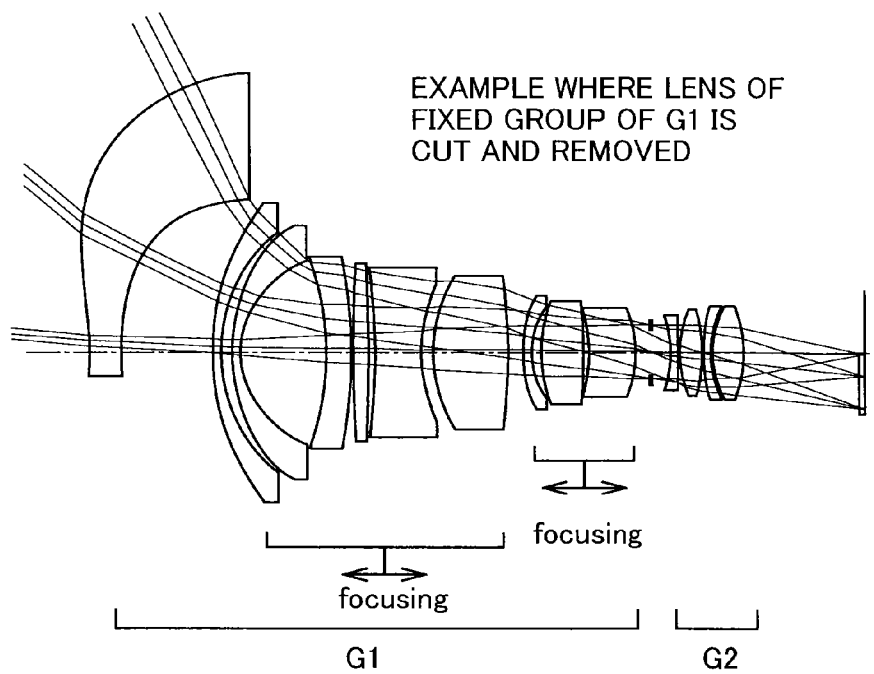
FIG. 7B is a cross-sectional view which shows a state where an oblique ray passes through the lens for projection.

Each of FIGS. 7A and 7B shows a lens for projection of Example 4.

As shown in each of FIGS. 7A and 7B, a first lens group G1 is constituted of ten lenses L101 to L110, and a second lens group G2 is constituted of four lenses L201 to L204.

Each of the first lens group G1 and the second lens group G2 has a positive power.

The lens L101 is considered a form of a negative meniscus lens.

A surface on the enlargement side of the lens L101 is an aspherical surface which has a concave shape on the enlargement side at a center portion of the lens L101 around an optical axis, has an inflection point in a direction perpendicular to the optical axis, and has a convex shape on the enlargement side at a peripheral portion of the lens L101. Additionally, the lens L101 has a largest thickness at a most peripheral portion of the lens L101.

Additionally, the lens L101 has a large uneven thickness ratio.

The lens L102 is a negative meniscus lens which has a concave surface on the reduction side, and the lens L103 is a negative meniscus lens which has a concave surface on the reduction side.

The lens L104 is a positive meniscus lens which has a convex surface on the reduction side, the lens L105 is a biconvex lens, the lens L106 is a biconcave lens, and the lens L107 is a biconvex lens.

The lens L108 is a negative meniscus lens which has a concave surface on the reduction side, and the lens L109 is a positive meniscus lens which has a convex surface on the enlargement side.

The lens L110 is a positive meniscus lens which has a convex surface on the reduction side.

Accordingly, the lenses L101, L102, L103, L106, and L108 of the ten lenses constituting the first lens group G1 are negative lenses, and the remaining five lenses are positive lenses.

Each of the six lenses L102, L103, L104, L105, L106 and L107, and the three lenses L108, L109 and L110 of the first lens group G1 constitutes a moving group which moves in an optical axis direction when focusing. The lens (lens L101) of the first lens group G1 except the lenses L102 to L107, and the lenses L108 to L110 constitutes a fixed group.

The second lens group G2 is constituted of four lenses L201, L202, L203, and L204.

The lens L201 is a negative meniscus lens which has a concave surface on the enlargement side, and the lens L202 is a biconvex lens.

The lens L203 is a negative meniscus lens which has a concave surface on the reduction side, and the lens L204 is a biconvex lens.

In Example 4, a range of the focal length of the entire optical system: F, the f-number: Fno, and a half angle of view at a wide-angle end: ωw are as follows.

$F$=5.76 mm, $Fno$=2.55, and $\omega w$=62.9°.

Data of Example 4 is shown in Table 13.

TABLE 13

|  | R | D | Nd | vd | Lens | Group |
|---|---|---|---|---|---|---|
| 1* | −61.084 | 6.5 | 1.5247 | 56.2 | L101 | G1 |
| 2* | 57.051 | s2 |  |  |  |  |
| 3 | 47.458 | 1.7 | 2.0027 | 19.3 | L102 |  |
| 4 | 30.916 | 2.7 |  |  |  |  |
| 5* | 39.282 | 1.7 | 1.5247 | 56.2 | L103 |  |
| 6* | 19.170 | 17.3 |  |  |  |  |
| 7 | −58.173 | 5.3 | 1.7725 | 49.6 | L104 |  |
| 8 | −113.485 | 0.4 |  |  |  |  |
| 9 | 253.356 | 3.0 | 1.6990 | 30.1 | L105 |  |
| 10 | −483.494 | 1.3 |  |  |  |  |
| 11 | −129.133 | 9.6 | 1.7445 | 51.0 | L106 |  |
| 12 | 33.823 | 2.5 |  |  |  |  |
| 13 | 31.447 | 15.0 | 1.7050 | 33.0 | L107 |  |
| 14 | −127.815 | s14 |  |  |  |  |
| 15 | 25.905 | 1.8 | 1.7725 | 49.6 | L108 |  |
| 16 | 16.197 | 2.3 |  |  |  |  |
| 17 | 30.655 | 8.2 | 1.7635 | 24.7 | L109 |  |
| 18 | −300.662 | 1.4 |  |  |  |  |
| 19 | −33.969 | 9.4 | 1.4970 | 81.6 | L110 |  |
| 20 | −24.851 | s20 |  |  |  |  |
| 21 | INF | 4.0 |  |  |  | G2 |
| 22 | −22.063 | 1.5 | 1.8340 | 37.3 | L201 |  |
| 23 | 1149.974 | 0.3 |  |  |  |  |
| 24 | 19.201 | 4.7 | 1.4970 | 81.6 | L202 |  |
| 25 | −34.920 | 0.3 |  |  |  |  |
| 26 | 37.685 | 1.5 | 1.9229 | 20.9 | L203 |  |
| 27 | 18.424 | 0.3 |  |  |  |  |
| 28* | 17.061 | 6.4 | 1.4875 | 70.4 | L204 |  |
| 29* | −20.6 | 24.0 |  |  |  |  |
| 30 | INF | 1.1 | 1.516798 | 64.1983 | CG | — |
| 31 | INF | — |  |  |  |  |

"Data of Aspherical Surfaces"

Data of aspherical surfaces is shown in Table 14.

TABLE 14

|  | 1 | 2 | 5 | 6 | 28 | 29 |
|---|---|---|---|---|---|---|
| k | 0 | −3.12165 | 0 | 0.00514 | −0.77486 | −1.26874 |
| C4 | 1.2810E−05 | −4.0251E−06 | 5.8202E−06 | 2.1932E−05 | 2.1346E−05 | 2.7360E−05 |
| C6 | −5.1982E−09 | 3.6968E−08 | 8.4213E−08 | −6.6623E−08 | 1.3529E−07 | 3.5248E−07 |
| C8 | 5.9241E−14 | −3.5711E−11 | −1.1566E−11 | −6.0674E−11 | 5.1247E−10 | −1.2711E−09 |
| C10 | 1.2162E−15 | 3.0950E−14 | −5.8637E−15 | −1.2043E−13 | −7.8957E−12 | 1.6851E−11 |
| C12 | −4.8629E−19 | −6.0908E−17 | 4.5402E−19 | 4.7866E−19 | 0.0000E+00 | −8.4319E−16 |
| C14 | 6.1699E−23 | 6.9096E−20 | 3.8288E−20 | 1.1046E−18 | 0.0000E+00 | 4.0150E−21 |
| C16 | 2.3209E−28 | −1.3167E−23 | −6.4634E−24 | −3.1087E−22 | 0.0000E+00 | −1.1720E−25 |
| C18 | −1.1098E−32 | 5.5731E−28 | 1.8921E−26 | 5.0634E−24 | 0.0000E+00 | 0.0000E+00 |
| C20 | 4.3389E−37 | −6.3918E−31 | 6.4402E−29 | −2.8765E−26 | 0.0000E+00 | 0.0000E+00 |

In Table 15, distances between surfaces: s2, s14, and s20 are shown when changing a projection distance: s0.

TABLE 15

| s0 | s2 | s14 | s20 |
|---|---|---|---|
| 690 | 18.53 | 3.08 | 3.08 |
| 506 | 18.62 | 3.57 | 2.63 |
| 1072 | 18.46 | 2.57 | 3.52 |

"Value of Parameter of Each Conditional Expression"

In Table 16, values of parameters of the conditional expressions (1) to (6) are shown.

TABLE 16

| (1) | F1/F2 | 0.76 |
|---|---|---|
| (2) | FA1/F1 | 2.29 |
| (3) | H1s/H1e | 7.9 |
| (4) | L101 − b/1.101 − a | 4.0 |
| (5) | 0AL/F | 27.6 |
| (6) | Bf/F | 4.2 |

Figure 8:
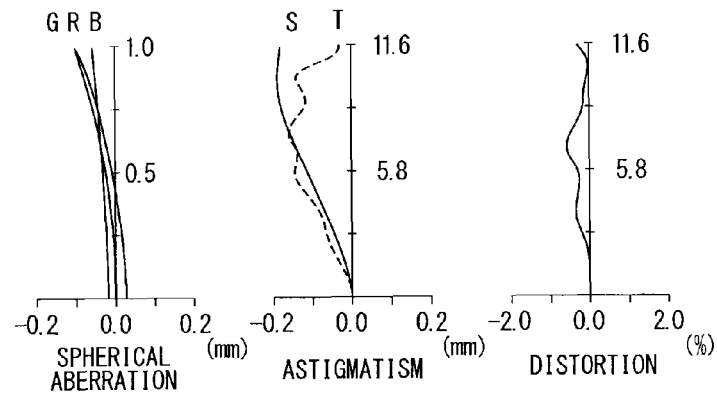
FIG. 8 shows distortion diagrams of the lens for projection of Example 4.
Figure 8:
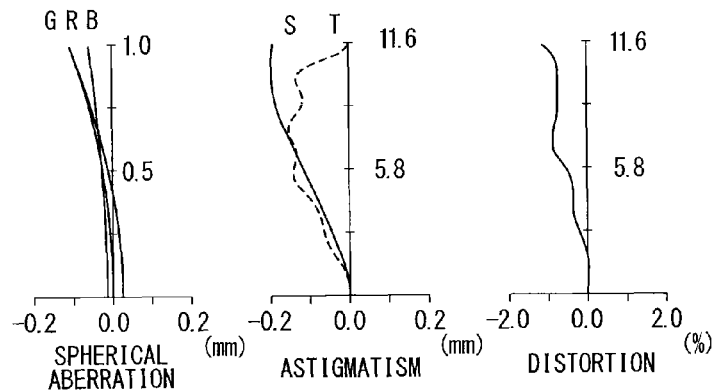
Figure 8:
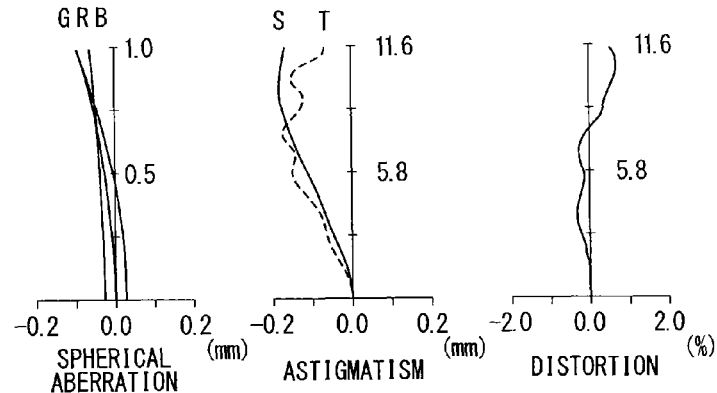

In FIG. 8, aberration diagrams of Example 4 are shown.

Example 5

Figure 9A:
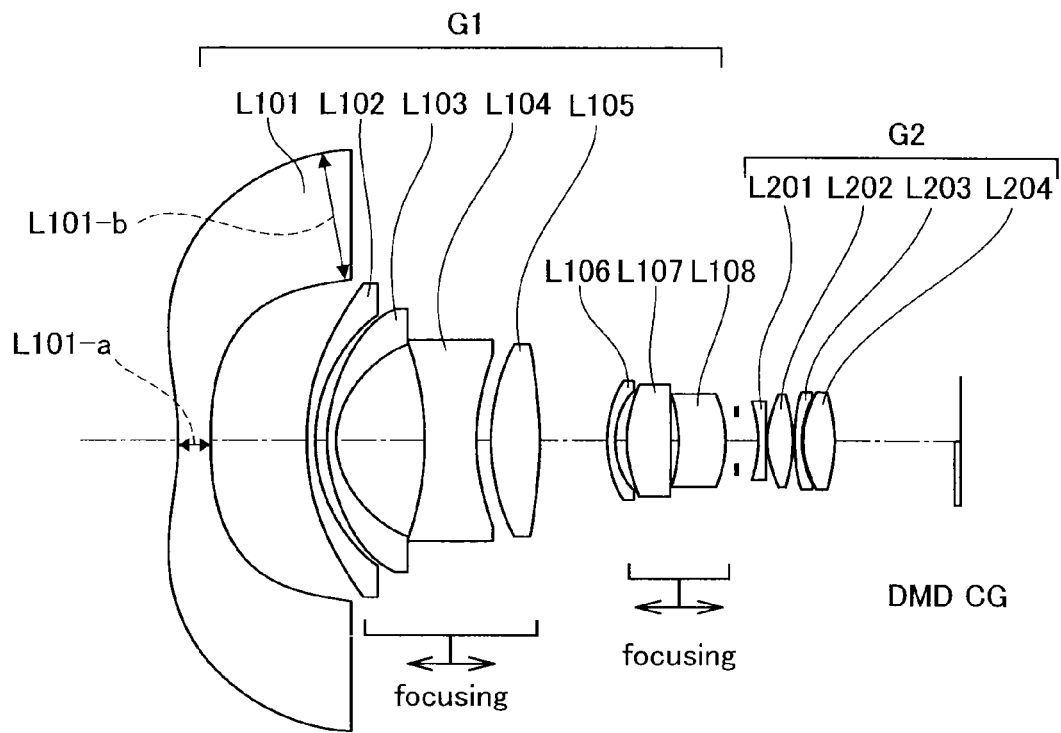
FIG. 9A is a cross-sectional view which shows a structure of a lens for projection of Example 5.
Figure 9B:
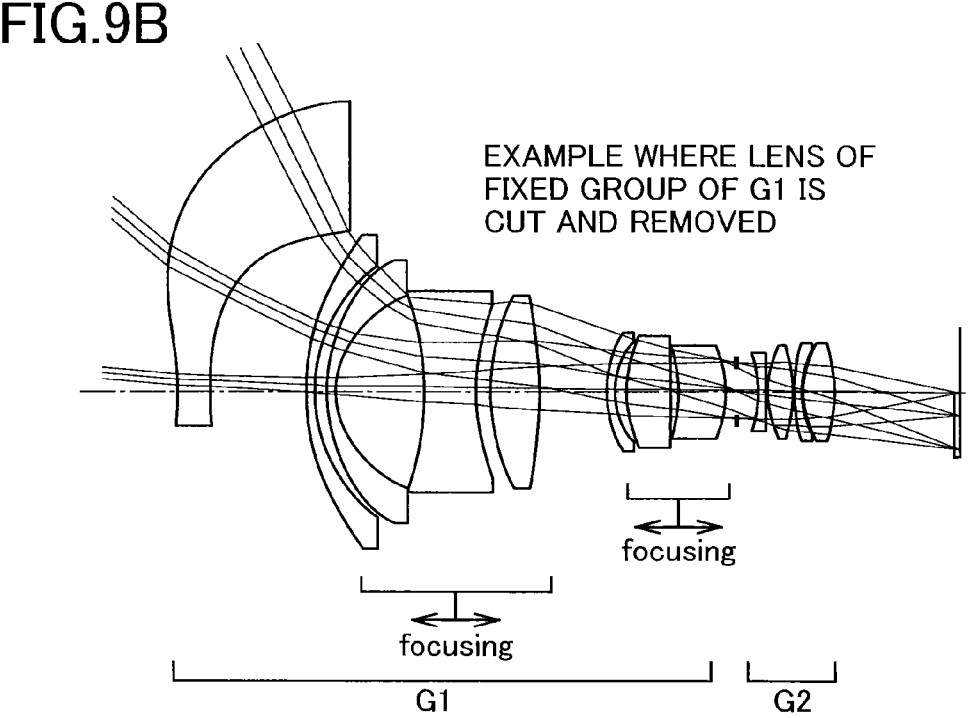
FIG. 9B is a cross-sectional view which shows a state where an oblique ray passes through the lens for projection.

Each of FIGS. 9A and 9B shows a lens for projection of Example 5.

As shown in each of FIGS. 9A and 9B, a first lens group G1 is constituted of eight lenses L101 to L108, and a second lens group G2 is constituted of four lenses L201 to L204.

Each of the first lens group G1 and the second lens group G2 has a positive power.

The lens L101 is considered a form of a negative meniscus lens.

A surface on the enlargement side of the lens L101 is an aspherical surface which has a concave shape on the enlargement side at a center portion of the lens L101 around an optical axis, has an inflection point in a direction perpendicular to the optical axis, and has a convex shape on the enlargement side at a peripheral portion of the lens L101. Additionally, the lens L101 has a largest thickness at a most peripheral portion of the lens L101.

Additionally, the lens L101 has a large uneven thickness ratio.

The lens L102 is a negative meniscus lens which has a concave surface on the reduction side, and the lens L103 is a negative meniscus lens which has a concave surface on the reduction side.

The lens L104 is a biconcave lens, the lens L105 is a biconvex lens, the lens L106 is a negative meniscus lens which has a concave surface on the reduction side.

The lens L107 is a positive meniscus lens which has a convex surface on the enlargement side, and the lens L108 is a positive meniscus lens which has a convex surface on the reduction side.

Accordingly, the lenses L101, L102, L103, L104, and L106 of the eight lenses constituting the first lens group G1 are negative lenses, and the remaining three lenses are positive lenses.

Each of the four lenses L102, L103, L104 and L105, and the three lenses L106, L107, and L108 of the first lens group G1 constitutes a moving group which moves in an optical axis direction when focusing. The lens (lens L101) of the first lens group G1 except the lenses L102 to L105, and the lenses L106 to L108 constitutes a fixed group.

The second lens group G2 is constituted of four lenses L201, L202, L203, and L204.

The lens L201 is a negative meniscus lens which has a concave surface on the enlargement side, and the lens L202 is a biconvex lens.

The lens L203 is a negative meniscus lens which has a concave surface on the reduction side, and the lens L204 is a biconvex lens.

In Example 5, a range of the focal length of the entire optical system: F, the f-number: Fno, and a half angle of view at a wide-angle end: ωw are as follows.

$F=5.75$ mm, $Fno=2.55$, and $\omega w=62.8°$.

Data of Example 5 is shown in Table 17.

TABLE 17

| | R | D | Nd | νd | Lens | Group |
|---|---|---|---|---|---|---|
| 1* | −60.270 | 6.4 | 1.5247 | 56.2 | L101 | G1 |
| 2* | 58.787 | s2 | | | | |
| 3 | 47.489 | 1.7 | 2.0027 | 19.3 | L102 | |
| 4 | 31.173 | 2.7 | | | | |
| 5* | 39.447 | 1.5 | 1.5247 | 56.2 | L103 | |
| 6* | 19.243 | 17.7 | | | | |
| 7 | −59.857 | 10.3 | 1.7725 | 49.6 | L104 | |
| 8 | 46.585 | 2.9 | | | | |
| 9 | 41.187 | 9.7 | 1.7174 | 29.5 | L105 | |
| 10 | −96.095 | s10 | | | | |
| 11 | 23.605 | 1.5 | 1.7725 | 49.6 | L106 | |
| 12 | 15.609 | 2.4 | | | | |
| 13 | 27.326 | 8.6 | 1.7847 | 25.7 | L107 | |
| 14 | 476.034 | 1.7 | | | | |
| 15 | −32.608 | 9.3 | 1.4970 | 81.6 | L108 | |
| 16 | −22.997 | 2.1 | | | | |
| 17 | INF | s17 | | | | G2 |
| 18 | −22.554 | 1.5 | 1.8340 | 37.3 | L201 | |
| 19 | 663.506 | 0.3 | | | | |
| 20 | 19.531 | 4.8 | 1.4970 | 81.6 | L202 | |
| 21 | −34.402 | 0.3 | | | | |
| 22 | 37.770 | 1.5 | 1.9229 | 20.9 | L203 | |
| 23 | 19.242 | 0.3 | | | | |
| 24* | 17.701 | 6.4 | 1.4875 | 70.4 | L204 | |
| 25* | −22.199 | 24.0 | | | | |
| 26 | INF | 1.1 | 1.5168 | 64.2 | CG | — |
| 27 | INF | — | | | | |

"Data of Aspherical Surfaces"

Data of aspherical surfaces is shown in Table 18.

TABLE 18

| | 1 | 2 | 5 | 6 | 24 | 25 |
|---|---|---|---|---|---|---|
| k | 0 | −3.69518 | 0 | 0.01229 | −0.68717 | −1.53165 |
| C4 | 1.2958E−05 | −3.8295E−06 | 6.5689E−06 | 2.1644E−05 | −1.8729E−05 | 3.0179E−05 |
| C6 | −5.2126E−09 | 3.6772E−08 | −1.0371E−09 | −6.5179E−08 | 8.5057E−08 | 3.4374E−07 |
| C8 | 5.8389E−14 | −3.5660E−11 | −1.1112E−11 | −5.6256E−11 | 4.7705E−10 | −1.6739E−09 |
| C10 | 1.2167E−15 | 3.1445E−14 | −3.8339E−15 | −1.1387E−13 | −4.6594E−12 | 2.0084E−11 |
| C12 | −4.8653E−19 | −6.0168E−17 | 2.1275E−18 | −8.4791E−18 | 0.0000E+00 | −8.4331E−16 |
| C14 | 6.1557E−23 | 6.8482E−20 | 3.9928E−20 | 8.8740E−19 | 0.0000E+00 | −2.5548E−22 |
| C16 | 2.6708E−28 | −1.5695E−23 | −5.7601E−24 | −8.9537E−22 | 0.0000E+00 | −1.1704E−25 |
| C18 | 0.0000E+00 | 0.0000E+00 | 1.7235E−26 | 4.7937E−24 | 0.0000E+00 | 0.0000E+00 |
| C20 | 0.0000E+00 | 0.0000E+00 | 5.7579E−29 | −1.9438E−26 | 0.0000E+00 | 0.0000E+00 |

In Table 19, distances between surfaces: s2, s10, and s17 are shown when changing a projection distance: s0.

TABLE 19

| s0 | s2 | s10 | s17 |
|---|---|---|---|
| 690 | 19.09 | 13.36 | 4.33 |
| 415 | 19.14 | 14.10 | 3.54 |
| 1380 | 18.83 | 12.95 | 5.01 |

"Value of Parameter of Each Conditional Expression"

In Table 20, values of parameters of the conditional expressions (1) to (6) are shown.

TABLE 20

| (1) | F1/F2 | 0.70 |
|---|---|---|
| (2) | FA1/F1 | 2.46 |
| (3) | H1s/H1e | 8.2 |
| (4) | L101 − b/L101 − a | 3.9 |
| (5) | OAL/F | 27.0 |
| (6) | Bf/F | 4.2 |

Figure 10:
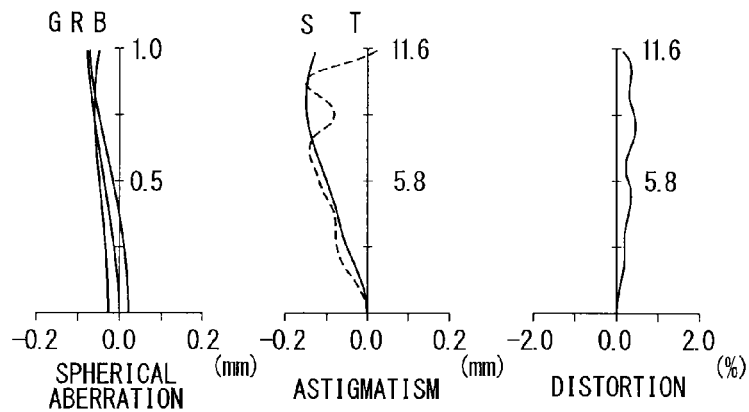
FIG. 10 shows distortion diagrams of the lens for projection of Example 5.
Figure 10:
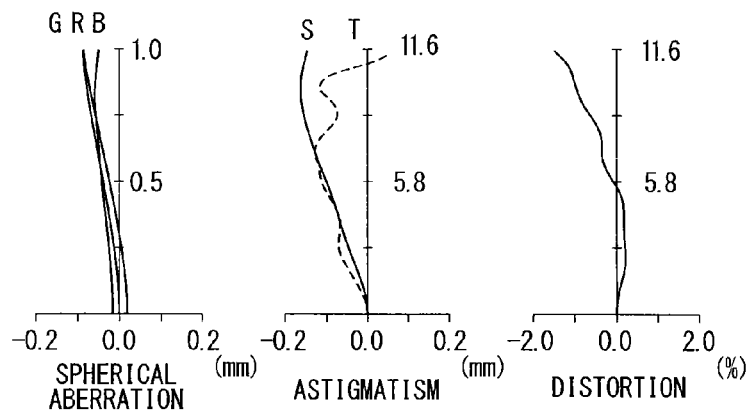
Figure 10:
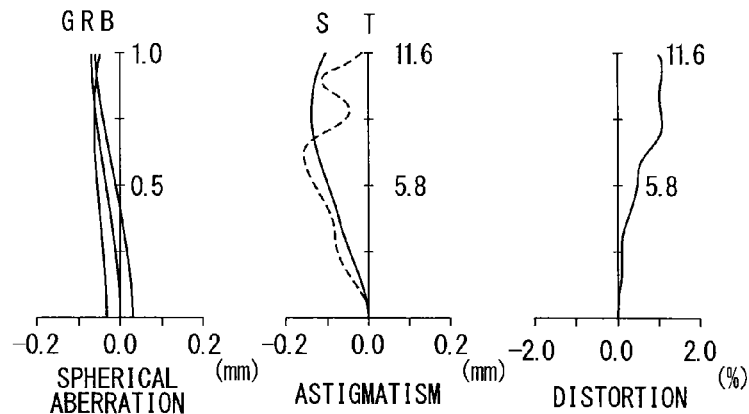

In FIG. 10, aberration diagrams of Example 5 are shown.

The lens for projection of each of Examples 1 to 5 has a wide angle of view in which a half angle of view exceeds 60 degrees.

Additionally, as shown in the aberration diagrams, in the lens for projection of each of Examples 1 to 5, various aberrations are corrected at a high level.

Furthermore, even when focusing is performed in accordance with a change of projection distance, spherical aberration, astigmatism, field curvature, chromatic aberration of magnification, and distortion are sufficiently corrected.

According to the embodiments of the present invention, it is possible to achieve a new lens for projection having a wide angle of view and a favorable performance, and an image display device.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A lens for projection, which is used in an image display device which includes an image display element and projects and displays an image displayed on an image display surface of the image display element as a projection image on a projected surface in an enlarged manner,
    the lens for projection comprising, in order from an enlargement side to a reduction side,
    a first lens group which is comprised of eight to ten lenses and has a positive refractive power;
    an aperture; and
    a second lens group which is comprised of four lenses and has a positive refractive power,
    wherein the first lens group includes at least one aspherical lens, and the at least one aspherical lens included in the first lens group has a largest thickness at a most peripheral portion of the lens,
    wherein a surface of the at least one aspherical lens has a concave shape on the enlargement side at a center portion of the lens around an optical axis, an inflection point in a direction perpendicular to the optical axis, and a convex shape on the enlargement side at a peripheral portion of the lens, and
    wherein an effective diameter of a lens on a most enlargement side of the first lens group H1s, and an effective diameter of a lens on a most reduction side of the first lens group H1e, satisfy a conditional expression (3): 3.9<H1s/H1e<9.2.

2. The lens for projection according to claim 1, wherein the first lens group is divided into a fixed group and at least one moving group, and focusing is performed by moving the at least one moving group in an optical axis direction.

3. The lens for projection according to claim 1, wherein a focal length of the first lens group F1, and a focal length of the second lens group F2, satisfy a conditional expression (1): 0.48<F1/F2<0.86.

4. The lens for projection according to claim 1, wherein a lens on a most enlargement side of the first lens group is an aspherical lens, and a focal length of the first lens group F1, and a focal length of the aspherical lens on the most enlargement side of the first lens group FA1, satisfy a conditional expression (2): 2.1<|FA1/F1|<3.0.

5. The lens for projection according to claim 1, wherein a thickness at a thinnest portion of a lens on a most enlargement side of the first lens group L101-a, and a thickness at a thickest portion of the lens on the most enlargement side of the first lens group L101-b, satisfy a conditional expression (4): 3.8<L101−b/L101-a<4.4.

6. The lens for projection according to claim 1, wherein a focal length of an entire optical system F, and a distance from a surface on an enlargement side of a lens on a most enlargement side of the first lens group to the image display surface of the image display element OAL, satisfy a conditional expression (5): 25.9<OAL/F<28.6.

7. The lens for projection according to claim 1, wherein a focal length of an entire optical system F, and a distance from a lens surface on a most reduction side of the second lens group to the image display surface of the image display element Bf, satisfy a conditional expression (6): 4.0<Bf/F<4.3.

8. The lens for projection according to claim 1, wherein a lens on a most enlargement side of the first lens group is an aspherical lens which has the largest thickness at the most peripheral portion of the lens.

9. An image display device, comprising:
    an image display element which displays an image to be projected on an image display surface;
    an illumination optical system which illuminates the image display surface on which the image is displayed; and
    a projection optical system to which a projection luminous flux which is emitted by the illumination optical system and modulated by the image is incident, by which the incident projection luminous flux is imaged, and which projects the imaged image in an enlarged manner as a projection image on a projected surface,
    wherein the projection optical system includes the lens of claim 1 for projection.

10. A lens for projection, which is used in an image display device which includes an image display element and projects and displays an image displayed on an image display surface of the image display element as a projection image on a projected surface in an enlarged manner,
    the lens for projection comprising, in order from an enlargement side to a reduction side,
    a first lens group which is comprised of eight to ten lenses and has a positive refractive power;
    an aperture; and
    a second lens group which is comprised of four lenses and has a positive refractive power, wherein the first lens group includes at least one aspherical lens, and the at least one aspherical lens included in the first lens group has a largest thickness at a most peripheral portion of the lens, and wherein a lens on a most enlargement side of the first lens group is an aspherical lens, and a focal length of the first lens group F1, and a focal length of the aspherical lens on the most enlargement side of the first lens group FA1, satisfy a conditional expression (2): 2.1|FA1/F1|<3.0.

11. An image display device, comprising:

an image display element which displays an image to be projected on an image display surface;

an illumination optical system which illuminates the image display surface on which the image is displayed; and a projection optical system to which a projection luminous flux which is emitted by the illumination optical system and modulated by the image is incident, by which the incident projection luminous flux is imaged, and which projects the imaged image in an enlarged manner as a projection image on a projected surface, wherein the projection optical system includes the lens of claim 10 for projection.

* * * * *